(12) United States Patent  
Mehrl et al.

(10) Patent No.: US 8,634,125 B2  
(45) Date of Patent: Jan. 21, 2014

(54) SYSTEM AND METHOD FOR DISPLAYING IMAGES

(75) Inventors: David Joseph Mehrl, Plano, TX (US); James N. Malina, Glendale, CA (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 13/289,325

(22) Filed: Nov. 4, 2011

(65) Prior Publication Data

US 2012/0050839 A1    Mar. 1, 2012

Related U.S. Application Data

(62) Division of application No. 12/852,309, filed on Aug. 6, 2010, now Pat. No. 8,054,529, which is a division of application No. 11/353,263, filed on Feb. 14, 2006, now abandoned.

(51) Int. Cl.  
*G02B 26/00* (2006.01)

(52) U.S. Cl.  
USPC .......................................................... 359/290

(58) Field of Classification Search  
USPC ......... 359/290, 291, 292, 250, 247, 242, 220, 359/221, 223, 224, 226; 345/84, 85  
See application file for complete search history.

(56) References Cited

U.S. PATENT DOCUMENTS

| | | | |
|---|---|---|---|
| 6,687,428 | B2 | 2/2004 | Huber et al. |
| 6,710,909 | B2 | 3/2004 | Naito |
| 6,724,546 | B2 | 4/2004 | Nishimae et al. |
| 6,831,720 | B2 | 12/2004 | Jiang et al. |
| 7,263,253 | B2 | 8/2007 | Davis et al. |
| 2003/0081321 | A1 | 5/2003 | Moon et al. |
| 2003/0228154 | A1 | 12/2003 | Kiser et al. |
| 2007/0216982 | A1 | 9/2007 | Sanders et al. |

*Primary Examiner* — Tuyen Tra  
(74) *Attorney, Agent, or Firm* — Warren L. Franz; Wade J. Brady, III; Frederick J. Telecky, Jr.

(57) ABSTRACT

System and method for simultaneous display of multiple images using a single light modulator array. A preferred embodiment comprises a light source that produces a light with desired spectral characteristics, a color filter optically coupled to the light source, and an array of light modulators optically coupled to the color filter. The color filter filters light from the light source to produce light of desired wavelengths and the array of light modulators simultaneously displays multiple images onto a display plane. Portions of the array of light modulators are designed so that each portion can independently display an image and the light source provides needed light to display the image.

20 Claims, 5 Drawing Sheets

FIG. 7c

SYSTEM AND METHOD FOR DISPLAYING IMAGES

This application is division of application Ser. No. 12/852,309, filed Aug. 6, 2010 (now U.S. Pat. No. 8,054,529), which is a division of application Ser. No. 11/353,263, filed Feb. 14, 2006, the entireties of all of which are hereby incorporated by reference.

BACKGROUND

The invention relates generally to a system and a method for displaying images, and more particularly to a system and a method for the simultaneous display of multiple images using a single light modulator array.

In certain applications, there is a desire to display two (or more) images onto a single display plane of a display system. For example, in the projection of three dimensional (3-D) images using stereoscopy, two component images of a single three dimensional image are displayed onto the single common display plane using polarized light with orthogonal polarizations. Audiences using special optical devices, such as 3-D glasses, that cancel out one of the two images per eye can then see a single 3-D image on the display plane. Additionally, it is possible to reduce color flicker and color banding on a display system if two (or more) images, each being displayed with a different colored light, are displayed simultaneously on a single display surface. Each of the images contains color image data from a single image being displayed by the display system. For example, at a given time, a first image may contain green color image data and a second image may contain blue color image data, whereas at some other time the images displayed may contain blue and red color image data or red and green color image data. In a three-color display system, it may be possible to display image data for all three colors.

Figure 1:
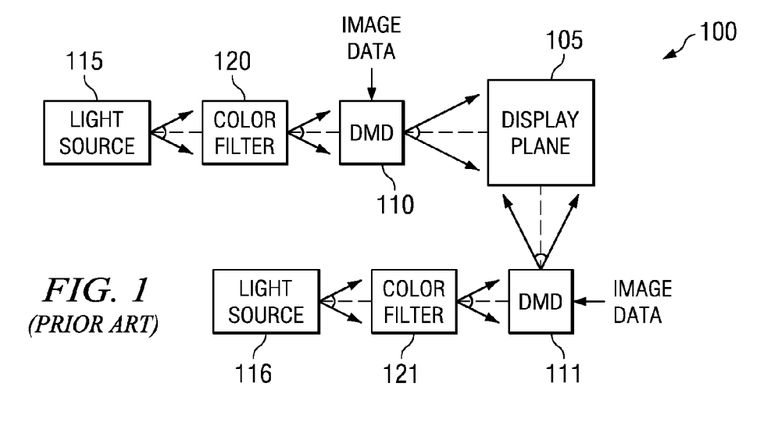
FIG. 1 is a diagram of a prior art display system.

With reference now to FIG. 1, there is shown a diagram illustrating a display system 100, wherein the display system can display two images simultaneously on a single display plane 105. In order to display two images onto the single display plane 105, the display system 100 can make use of two arrays of light modulators, with spatial light modulators (SLM) being used as light modulators. The diagram shown in FIG. 1 illustrates the display system 100 making use of a particular implementation of the array of light modulators referred to as a digital micromirror device (DMD). A DMD is an array of positional micromirrors that can reflect light from a light source onto the display plane 105 with the position (state) of the individual micromirrors being dependent upon the value of the image data being displayed. For example, if the image data being represented by a positional micromirror indicates that light should be placed onto the display plane 105, then the positional micromirror will be moved into a position so that light from a light source will reflect off the positional micromirror onto the display plane 105.

The diagram shown in FIG. 1 illustrates two DMDs, a first DMD 110 and a second DMD 111 in the display system 100. A light source 115 and a light source 116 can be used to provide the light needed to project the image data onto the display plane 105. A color filter 120, used in conjunction with the light source 115, and a color filter 121, used in conjunction with the light source 116, can be used to filter light provided by the light source 115 and light source 116 to provide necessary colors, such as red, blue, and green in a three-color display system. Although shown in FIG. 1 as being two distinct light sources, similar lighting performance can be achieved by using a single light source and a light splitter (not shown) that can split the light from the single light source into two light beams. The display system 100 shown in FIG. 1 displays significant components used in the display system 100, but for simplicity purposes, may leave out components that are required for proper operation, such as integrating rods, relay optics, beam shapers, and so forth.

If the display system 100 is to be used to project 3-D images using stereoscopy, the light source 115 and the light source 116 can be configured to produce light with orthogonal polarizations with respect to one another. If the display system 100 is to be used to project images with reduced color flicker and banding, then the light source 115 and the light source 116 can be configured to produce different colored lights.

The display system 100 can be formed from two separate projector systems, with the DMD 110 and the light source 115 forming one projector system and the DMD 111 and the light source 116 forming another projector system. Alternatively, both the DMD 110 and DMD 111 and the light source 115 and the light source 116 can be contained within a single projector system. Although shown as a display system comprised of two separate projector systems or a single projector system with two DMDs, it is possible to make use of more than two separate projector systems or DMDs. For example, in a display system that makes use of three component colors, such as red, green, and blue, it is possible to create three separate projector systems with one separate projector for each of the three component colors. This can be extended to an even larger number of projectors, such as in a display system that makes use of more than three component colors.

One disadvantage of the prior art is that with more than one separate projector or DMD, maintaining good alignment of the individual pixels can be very difficult. A small bump to the display system can result in misalignment of the images produced by the display system. Therefore, expensive optical components and regular calibration must be done regularly to ensure that the images remain aligned. Furthermore, since separate projectors or DMDs are used, differences in thermal expansion may result in a misalignment of the images that occurs only after the display system has been powered for a period of time.

Another disadvantage of the prior art is that the optics required to combine the images from the separate projectors or DMDs can be prohibitively expensive. Therefore the display systems that make use of separate projectors or DMDs are typically too expensive for all but high-end and commercial installations.

SUMMARY

Embodiments of the invention which provide a system and a method for simultaneous display of multiple images in a display system using a single light modulator array.

In accordance with a preferred embodiment, a micro-electromechanical system (MEMS) device with an array of light modulators is provided. The device includes a first subset of light modulators and a second subset of light modulators. Each light modulator in the first subset of light modulators modulates light along a first axis of reflection, while each light modulator in the second subset of light modulator modulates light along a second axis of reflection.

In accordance with another preferred embodiment of the invention, a display system is provided. The display system includes a light source, a color filter that is optically coupled to the light source, and an array of light modulators that is optically coupled to the color filter. The array of light modulators simultaneously displays multiple images onto a display plane with light from the light source used to display each image.

In accordance with another preferred embodiment of the invention, a method for simultaneously displaying multiple images with a single array of light modulators is provided. The method includes providing a first light along a first light path to illuminate an array of light modulators and providing a second light along a second light path to illuminate the array of light modulators. The first light has a first set of optical properties and the second light has a second set of optical properties. The method also includes setting a first light modulator state in a first subset of light modulators and setting a second light modulator state in a second subset of light modulators. The first light modulator state corresponds to a first set of image data and the second light modulator state corresponds to a second set of image data.

In accordance with another preferred embodiment of the invention, a method for fabricating an array of light modulators on a substrate is provided. The method includes forming electrical addressing circuitry on the substrate and forming a first subset of first hinges over a first portion of the electrical addressing circuitry. The first subset of hinges has a first axis of rotation. The method also includes forming a second subset of hinges over a second portion of the electrical addressing circuitry. The second subset of hinges has a second axis of rotation. The method further includes forming mirrors on each of the first hinges and each of the second hinges.

An advantage of a preferred embodiment of the invention is that a single array of light modulators in a display system can be used to simultaneously display more than one image on a display plane. The use of a single array of light modulators can simplify the optical system in the display system. A simpler optical system can also be cheaper, therefore, the cost of the display system can be decreased.

A further advantage of a preferred embodiment of the invention is that the use of the single array of light modulators can significantly reduce the cost of the optics and eliminate the need for frequent and expensive image alignment procedures. This can significantly reduce the operating cost of the display system.

The foregoing has outlined rather broadly the features and technical advantages of the invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawings, in which.

DETAILED DESCRIPTION OF ILLUSTRATIVE EMBODIMENTS

The making and using of the preferred embodiments are discussed in detail below. It should be appreciated, however, that the invention provides many applicable inventive concepts that can be embodied in a wide variety of specific contexts. The specific embodiments discussed are merely illustrative of specific ways to make and use the invention, and do not limit the scope of the invention.

The invention will be described with respect to preferred embodiments in a specific context, namely a display system that can simultaneously display two images using a single array of light modulators, wherein the light modulators are positional micromirrors. The array of light modulators may be a part of a micro-electromechanical system device. The two images can enable the use of stereoscopy to display 3-D images or the two images may display different color image data from a single image to help-mitigate color banding, rainbow effect, flicker, and so forth. The use of a color wheel to provide needed colored light results in the production of a sequence of colors being used in a display system rather than the simultaneous production of all colors used in the display system. For example, in a three color display system, the color wheel will produce a sequence of colors, for example, red, blue, green, red, blue, green, and so on. The sequence of colors, if not switched at a sufficient frequency, can lead to undesirable image artifacts, such as color banding or rainbow effects. The invention may also be applied in some situations, however, to other display systems that make use of other forms of light modulators, wherein the light modulators use light reflection to modulate light, such as deformable mirrors. Furthermore, the invention may also be applicable where there is a desire to display more than two images simultaneously using a single array of light modulators. For example, a single array of light modulators can be used to display three images, wherein each image contains color image data for a single image in a three-color display system. Similarly, four simultaneous images can be displayed using a single array of light modulators to display color image data for a single image in a four-color display system.

Figure 2:
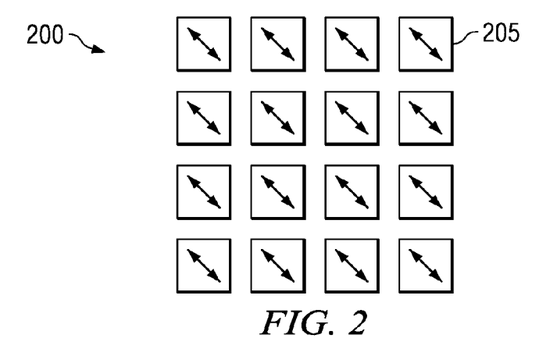
FIG. 2 is a diagram of an exemplary array of light modulators.

With reference now to FIG. 2, there is shown a diagram illustrating an exemplary array of light modulators 200, wherein the array of light modulators is an array of micromirrors of a spatial light modulator (SLM) in the form of a digital micromirror device (DMD). The DMD is a micro-electromechanical system device and may be a part of a larger micro-electromechanical system device. The micromirrors in a DMD typically pivot along a single axis (an axis of reflection), switching between one of two positions, with a first position reflecting light from a light source onto a display plane and a second position reflecting the light away from the display plane. The diagram shown in FIG. 2 illustrates the array of light modulators 200 with 16 light modulators (micromirrors) arranged in a 4×4 array. As shown in FIG. 2, the micromirror 205 pivots about a diagonal axis. The other 15 light modulators in the array of light modulators 200 also pivot about the same diagonal axis (the same axis of reflection). Alternatively, the array of light modulators is an array of deformable mirrors and the deformable mirrors in the array of light modulators deform to move light along a single axis, with one position along the axis being a display plane and another position along the axis being a light dump.

In order to simultaneously display multiple images using a single array of light modulators, portions of the array of light modulators need to be able to display image data from each of the images. For example, if an array of light modulators is divided into two parts, a first part can display image data from a first image and a second part can display image data from a second image. An additional requirement can be that the light needed for each of the images being displayed may be different. For example, the light used to project the two images displayed in 3-D stereoscopy may need to have orthogonal polarization, while to reduce color flickering and banding, the light used at the same time must be of different colors. A different light source (or a single light source that is split prior to being modulated by the array of light modulators) may be needed to provide the needed illumination for each of the images. To keep the light from the different light sources distinct, different optical paths should be used for each of the lights. To optimize optical quality (image quality), the light sources should be arranged to minimize interference. For example, with two light sources and the two resulting axes of reflection (reflecting from the reflective surface of the light modulators), arranging the light sources 90 degrees orthogonal to each other would minimize interference between the two light sources, while with three light sources, an arrangement of 120 degrees would minimize light interference. When three or more light sources are used, it may be necessary to reshape the micromirrors used in the light modulators to enable a tighter packing of the light modulators. The tighter packing of the light modulators can minimize light leaking below the micromirrors and potentially scattering back onto the display plane and decreasing the contrast ratio of the display system. For example, with three light sources, a hexagonal micromirror may maximize the packing of the light modulators.

However, since a typical design for micromirrors in a DMD permits the micromirrors to move along a single axis that is aligned with the micromirror's axis of reflection, a different arrangement of the light modulators in the array of light modulators is needed. The micromirrors designed to reflect light from one light source either onto or away from the display plane will need to pivot along an axis that is parallel to the light source in order to reflect the light either onto or away from the display plane.

Figure 3A:
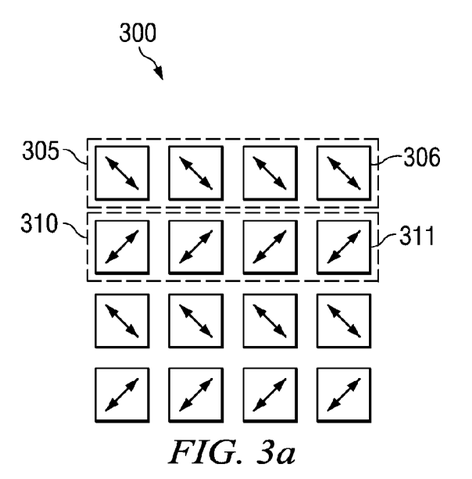
FIGS. 3a and 3b are diagrams of exemplary arrays of light modulators for use in simultaneously displaying two images, according to a preferred embodiment of the invention.
Figure 3B:
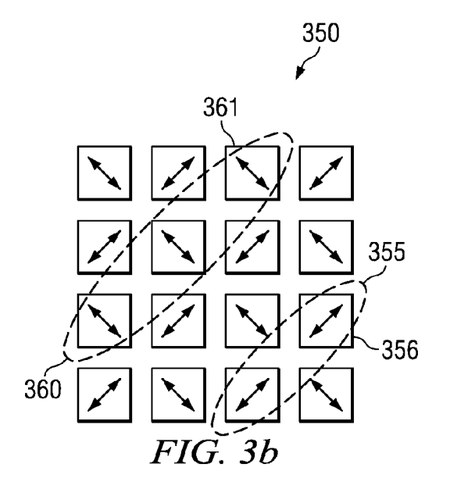

With reference now to FIGS. 3*a* and 3*b*, there are shown diagrams illustrating exemplary arrays of light modulators 300 and 350 designed to function with two distinct light sources arranged 90 degrees orthogonal to one another, according to a preferred embodiment of the invention. A single array of light modulators used to simultaneously display multiple images should be configured so that light modulators assigned to display the separate images are relatively evenly distributed throughout the array of light modulators. For example, in an array of light modulators used to simultaneously display two images, a first image should be displayed using 'even' numbered light modulators (or 'even' rows, columns, or diagonals of light modulators) and a second image should be displayed using 'odd' numbered light modulators (or 'odd' rows, columns, or diagonals of light modulators). The intent being that the interlaced multiple images will appear superimposed on one another on the display plane and appear as a single image. If distinct portions of the array of light modulators were assigned to display the multiple images, then the images would appear on separate portions of the display plane. For example, in an array of light modulators used to simultaneously display two images, if a first half portion of the array of light modulators were used to display a first image and a second half portion of the array of light modulators were used to display a second image, then on the display plane, the first image would appear on a first half while the second image would appear on a second half. The use of lenses and optical processing can potentially correct this, but would add unnecessary cost and complexity to the overall cost of the display system. Furthermore, the partitioning of the array of light modulator into distinct portions can cause aspect ratio problems wherein the dimensions of the portions of the array of light modulators may not match well with that of the images.

The diagram shown in FIG. 3*a* illustrates an array of light modulators 300 wherein alternate rows of light modulators are oriented along different axes of movement. It is possible to arrange light modulators in an array of light modulators so that alternating columns of light modulators are oriented along different axes of movement. A first row 305, for example, can have light modulators (micromirrors), such as light modulator 306, oriented along a first axis and a second row 310 can have light modulators, such as light modulator 311, oriented along a second axis. As shown in FIG. 3*a*, the first axis and the second axis are orthogonal to each other. The array of light modulators 300 can be designed by rotating a single design for a light modulator by 90 degrees to align the light modulators along one of the two axes. In the case of an array of light modulators being a DMD, wherein the reflective surface of each light modulator pivots along an axis that is perpendicular to the hinge, the orientation of the illumination light beams should be orthogonal to the hinge (parallel to the pivot of the reflective surface). Although shown in FIG. 3*a* as being oriented on the diagonals, any axis of orientation is possible. Therefore, the diagram shown in FIG. 3*a* should not be construed as being limiting to the scope or spirit of the invention.

The diagram shown in FIG. 3*b* illustrates an array of light modulators 350 wherein alternating diagonals of light modulators are oriented along different axes of movement. The array of light modulators 300 features light modulators in a single row (or column) being aligned along a single axis. For example, a first diagonal 355 can have light modulators, such as light modulator 366, oriented along a first axis and a second diagonal 360 can have light modulators, such as light modulator 361, oriented along a second axis, wherein the first axis and the second axis are orthogonal to each other. An array of light modulators with alternating diagonals of light modulators containing light modulators that are oriented along the same axes of movement can be designed by rotating alternating adjacent light modulators by 90 degrees. Although shown in FIG. 3*a* as being oriented on the diagonals, any axis of orientation is possible. Therefore, the diagram shown in FIG. 3*b* should not be construed as being limiting to the scope or spirit of the invention.

When more than one image is being displayed by a single array of light modulators, a decrease in the image's contrast may be observed. For example, with a conventional 12 degree DMD, centroids of light cones produced when a light modulators is on and when the light modulator is off are separated by 48 degrees. However, with two light sources arranged at 90 degrees to one another, the centroids of light cones produced when a light modulators is on and when the light modulator is off are separated by approximately 34 degrees. This decrease in separation between the centroids can result in a loss in contrast, since the light cones are closer together and light from a first light cone may bleed into a second light cone, e.g., due to scatting effects and light diffraction effects. However, the use of slower optics can regain the loss in contrast. Alternatively, the use of a 14 degree DMD in place of the more common 12 degree DMD can improve the separation of the centroids to about 38 degrees.

When more than two images are to be displayed by a single array of light modulators, it is possible to create an array of light modulators by rotating a single design for light modulator by an appropriate amount that can maximize the separation of the light sources used to illuminate the array of light modulators, for example, for a three image array of light modulators, the light modulators should be rotated by 120 degrees. When three or more images are being displayed, a light modulator with a rectangular micromirror may not provide optimum performance. Therefore an alternate design of the light modulator may be needed. For example, in a three image array of light modulators, a hexagonal shaped micromirror may provide better performance than a rectangular micromirror.

Since the display of more than one image using a single array of light modulators effectively decreases the resolution of the images, the quality of the images being displayed by the array of light modulators is not as high as if a single image is being displayed by an array of light modulators with the same device resolution. For example, if a 4×4 array of light modulators is used to display two images, each image can have a resolution that is equal to a 2×4 array of light modulators being used to display the images.

Optical dithering, a technique wherein a shift (or multiple shifts) of an image array, for example, an array of light modulators, combined with a display of a slightly shifted version of an image being displayed by the image array can effectively double the effective resolution of the image array. For an image array arranged in a rectilinear configuration, four half image element shifts are needed to double the effective resolution of the image array, while for an image array arranged in a diamond configuration, a single half image element shift is sufficient to double the effective resolution of the image array. The use of optical dithering can increase the image resolution of the multiple images that are being displayed by the array of light modulators and therefore can improve a viewing experience by recovering the spatial resolution that was lost by superimposing the interlaced images. For example, the array of light modulators 300 shown in FIG. 3*a* can be shifted in four, orthogonal, half image element shifts to double the effective resolution of images being displayed, while the array of light modulators 350 shown in FIG. 3*b* can be shifted in one half image element shift in a direction orthogonal or parallel to diagonals 355 or 360 to double the effective resolution of the images being displayed.

Figure 4A:
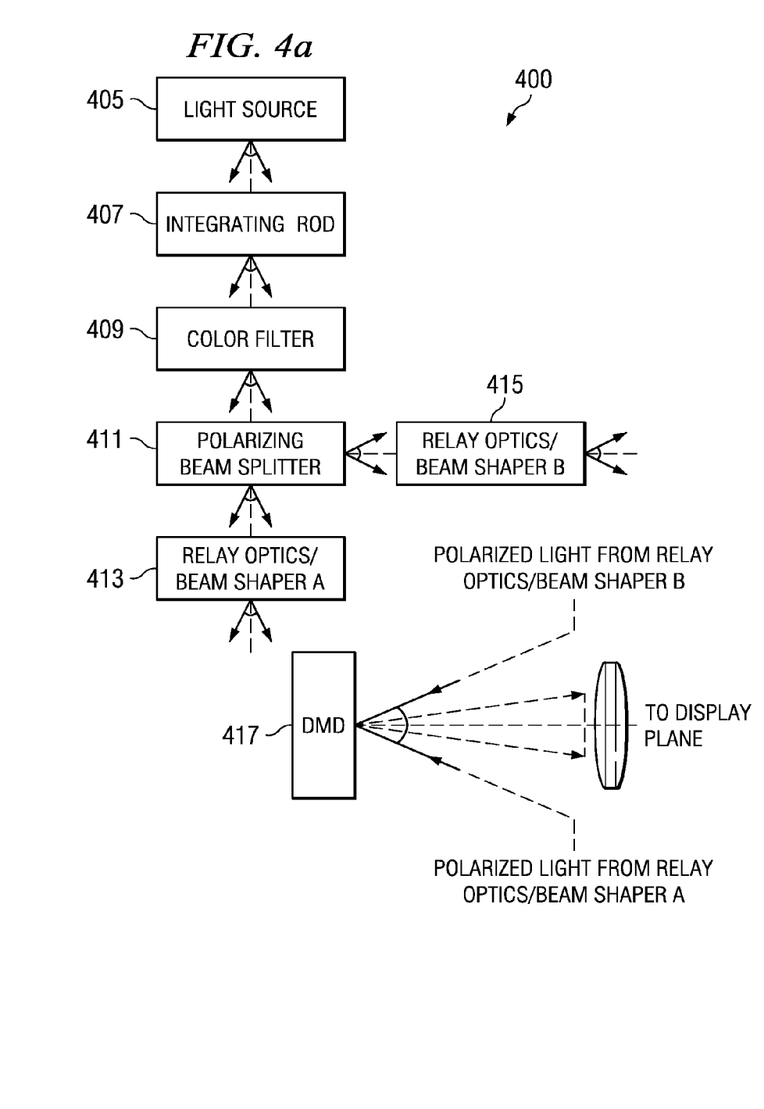
FIGS. 4a through 4c are diagrams of display systems for simultaneously displaying multiple images, according to a preferred embodiment of the invention.

With reference now to FIG. 4*a*, there is shown a diagram illustrating an exemplary display system 400, wherein two images can be displayed simultaneously for 3-D stereoscopy purposes, according to a preferred embodiment of the invention. The display system 400 can include a light source 405 that can provide desired illumination and can be in the form of an arc lamp, light emitting diodes, lasers, laser diodes, and so forth. Light from the light source 405 can then be made more uniform by an integrating rod 407. For wide-band light sources, such as light sources producing white light, a color filter 409, such as a rotating color wheel, can be used to filter the light from the integrating rod 407 and produce a desired color of light. For example, in a three color display system, the color filter 409 can filter the light to produce light with the colors red, green, and blue. However, the color filter 409 can be also used to produce light with desired chromatic characteristics for use in display systems with four, five, or more colors.

Colored light from the color filter 409 can then be split into two (or more) light beams by a polarizing beam splitter 411. In addition to splitting the light into two beams, the polarizing beam splitter can also polarize the light in each light beam. According to a preferred embodiment of the invention, the light in each light beam is polarized so that the polarity of the light in a first light beam is orthogonal to the polarity of the light in a second light beam. The first beam of light from the polarizing beam splitter 411 can be provided to a relay optics/beam shaper unit "A" 413 and the second beam of light from the polarizing beam splitter 411 can be provided to a relay optics/beam shaper unit "B" 415. The relay optics/beam shaper unit "A" 413 and the relay optics/beam shaper unit "B" 415 can provide optical processing and manipulation of the first beam of light and the second beam of light as well as routing the light to a DMD 417, where, depending upon the state of individual light modulators in the DMD 417, the light can be reflected onto a display plane or dumped into a light trap (not shown).

An alternative to the display system 400 is possible wherein two (or more) light sources are used in place of the light source 405. The use of multiple light sources can permit the use of smaller light sources that individually produce less light or the same size light source driven to a lower level. The use of multiple light sources can require the use of more than one integrating rod and potentially, multiple color filters. However, the polarizing beam splitter 411 may be eliminated and replaced with a simple polarizer or two (one for light from each of the two light sources).

Figure 4B:
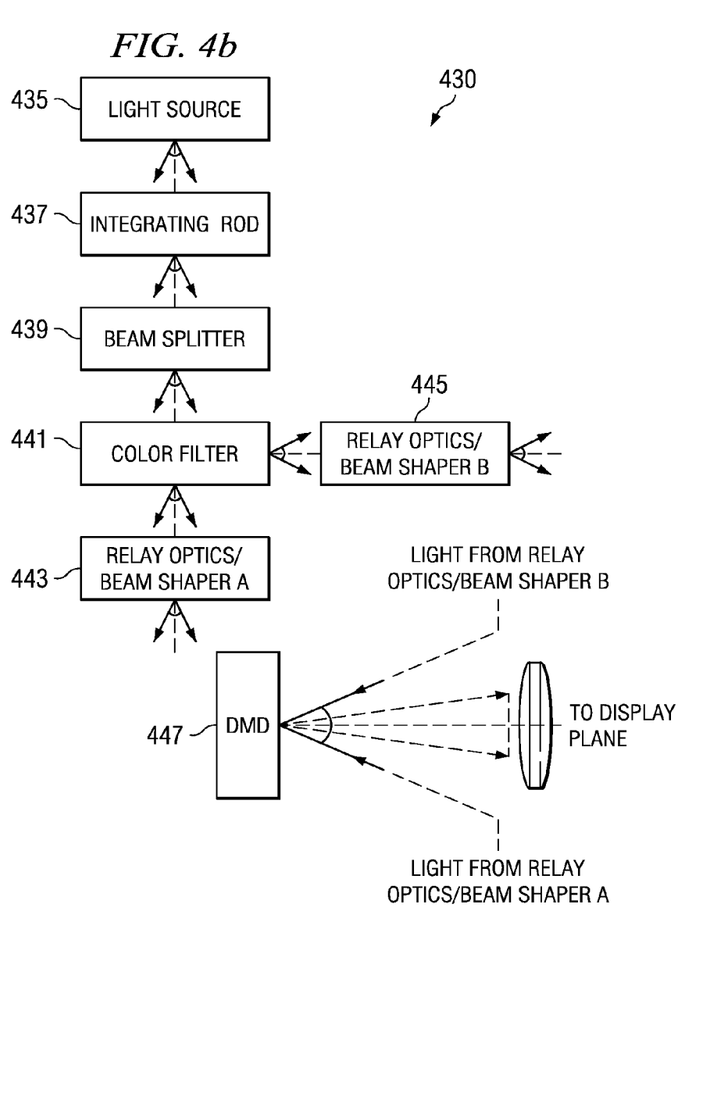

With reference now to FIG. 4*b*, there is shown a diagram illustrating an exemplary display system 430, wherein two sets of color image data from a single image can be displayed simultaneously for purposes of mitigating color banding and flickering, according to a preferred embodiment of the invention. The simultaneous display of color image data for multiple colors from a single image on a display plane can help improve image quality by decreasing color banding and flicker. Depending upon the display system, an image can contain image data for three, four, five, or more component colors. For example, in a three color display system, an image can contain image data for red, green, and blue component colors. According to a preferred embodiment of the invention, a display system, such as the display system 430, can simultaneously display two sets of color image data from a single image. For example, if the display system 430 is a three color display system, then the display system 430 can display color image data for component colors red and green, followed by color image data for component colors green and blue, then color image data for component colors blue and red, and so on.

The display system 430 can include a light source 435 that can provide desired illumination and can be in the form of an arc lamp, light emitting diodes, lasers, laser diodes, and so forth. Light from the light source 435 can then be made more uniform by an integrating rod 437. A beam splitter 439 can split the light from the integrating rod 437 into two (or more) beams of light. The two beams of light from the beam splitter 439 can be provided to a color filter 441 that may contain a single color filter, such as a color wheel that can filter the light from both beams of light or multiple color filters (color wheels), with one color filter for each beam of light. For example, in the case of a single color wheel, light from a first beam of light may strike the color wheel on a first portion of a face of the color wheel (with one color) and while simultaneously light from the second beam of light may strike the color wheel on a second portion (with a different color) of a face of the color wheel. As long as the color wheel is properly designed, the light from the first beam of light will be filtered to produce a first color and the light from the second beam of light will be filtered to produce a second color, with the first color being different from the second color. The use of a single color wheel can help to reduce the overall cost of the display system 430.

Colored light from the color filter 441 can then be provided to a relay optics/beam shaper unit "A" 443 and to a relay optics/beam shaper unit "B" 445. The relay optics/beam shaper unit "A" 443 and the relay optics/beam shaper unit "B" 445 can provide optical processing and manipulation of the first beam of light and the second beam of light as well as routing the light to a DMD 447, where, depending upon the state of individual light modulators in the DMD 447, the light can be reflected onto a display plane or dumped into a light trap (not shown).

Figure 4C:
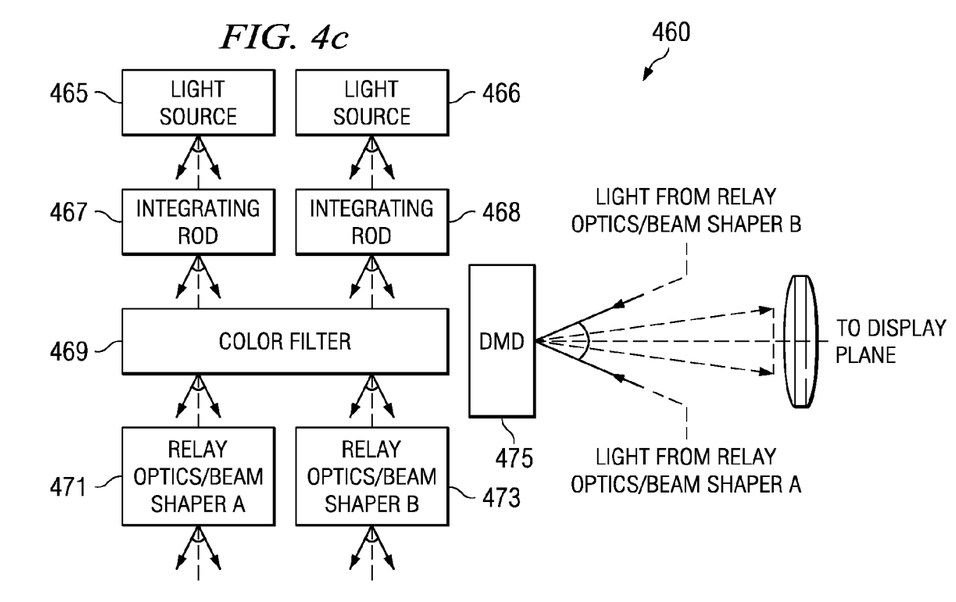

An alternate to the display 430 is possible wherein two (or more) light sources are used in place of the light source 435. A diagram shown in FIG. 4c illustrates a display system 460 with two light sources 465 and 466 are used in place of a single light source. The use of multiple light sources can enable the use of smaller light sources than required for a single light source display system or the same size light sources driven to a lower light level. For example, an LED light source can be driven so that a lower light level is produced. Driving the LED light source at a lower light level can increase the useful life of the light source. Each of the two light sources 465 and 466 can require a separate integrating rod 467 and 468 and a single color filter 469 that may contain a single color wheel used in a manner as described above or multiple color wheels, one per light source. Colored light from the color filter 469 can then be provided to separate relay optics/beam shaper units, such as relay optics/beam shaper unit "A" 471 and relay optics/beam shaper unit "B" 473, that can provide optical processing and manipulations of the colored light as well as routing of the colored light to a DMD 475, where, depending upon the state of individual light modulators in the DMD 475, the light can be reflected onto a display plane or dumped into a light trap (not shown).

Figure 5:
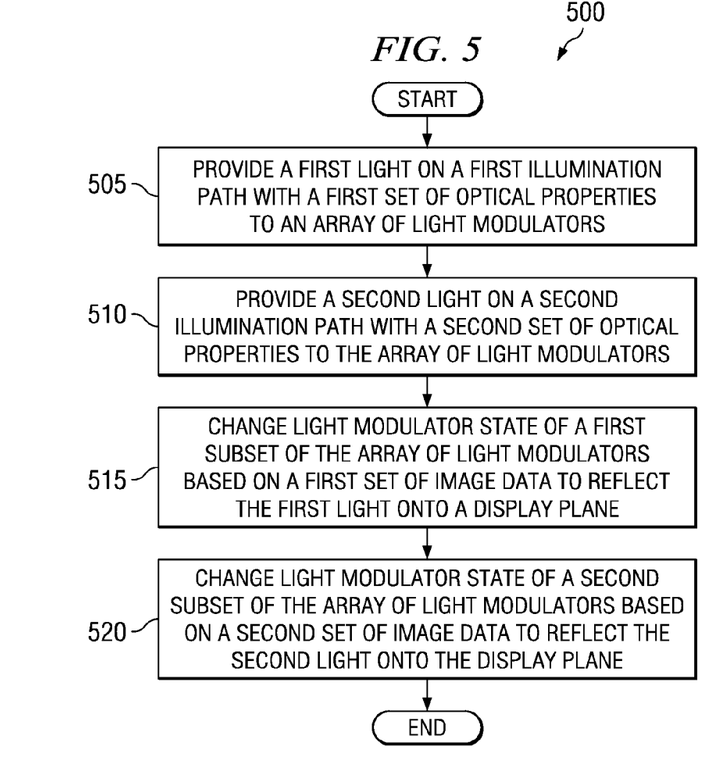
FIG. 5 is a diagram of a sequence of events in the simultaneous display of two sets of image data using a display system with a single array of light modulators, according to a preferred embodiment of the invention.

With reference now to FIG. 5, there is shown a diagram illustrating a sequence of events 500 in the use of a single array of light modulators in a display system to simultaneously display a plurality of images, according to a preferred embodiment of the invention. The sequence of events 500 describes the use of the single array of light modulators to simultaneously display two images on a display plane. However, the sequence of events 500 can be readily extended to simultaneously display three or more images using a single array of light modulators. Therefore, the discussion of the sequence of events 500 should not be construed as being limiting to either the scope or the spirit of the invention. Furthermore, the sequence of events 500 is not intended to imply temporal sequencing information of any type. For example, a first event displayed (and discussed) before a second event does not imply that the first event needs to occur before the second event unless specified. Often the two events can occur simultaneously.

The sequence of events 500 can begin with providing a first light on a first illumination path to an array of light modulators, wherein the first light has a first set of optical properties (block 505). For example, the first light in the first illumination path may have a certain polarization polarity or a certain color. While the first light on the first illumination path is illuminating the array of light modulators, a providing of a second light on a second illumination path to the array of light modulators, wherein the second light has a second set of optical properties, is occurring (block 510). The optical properties of the second light in the second illumination path should be different from the optical properties of the first illumination path or a single illumination path would have been adequate. For example, the second light may have a different polarization polarity or a different color or both. The providing of the first light and the second light can be as simple as providing power to a light source, sequentially providing power to a multitude of light sources, or may involve the issuance of a sequence of light control instructions or, for example, the controlled spinning of a wheel, placed in a white light path, containing color filters and/or polarizers to configure a light source (or light sources) to provide light with desired duration, color, polarization, and so forth.

Once the first light of the first illumination path and the second light of the second illumination path are on and illuminating the array of light modulators, a first set of image data can be provided to a first subset of light modulators in the array of light modulators (block 515). The first set of image data can be used to configure the states of the light modulators in the first subset of light modulators to properly display the image data on the display plane using the first illumination path. Depending upon the application of the display system, the first set of image data can contain image information for one of two images used in 3-D stereoscopy, color image data for a single image, or so forth. As the first set of image data is being provided to the first subset of light modulators (block 515), a second set of image data can be provided to a second subset of light modulators in the array of light modulators to configure the states of the light modulators in the second subset of light modulators to properly display the image data on the display plane using the second light (block 520). The providing of image data to the first subset of light modulators and the second subset of light modulators can continue until there is no more image data to provide or the display system is powered off or reset.

Figure 6:
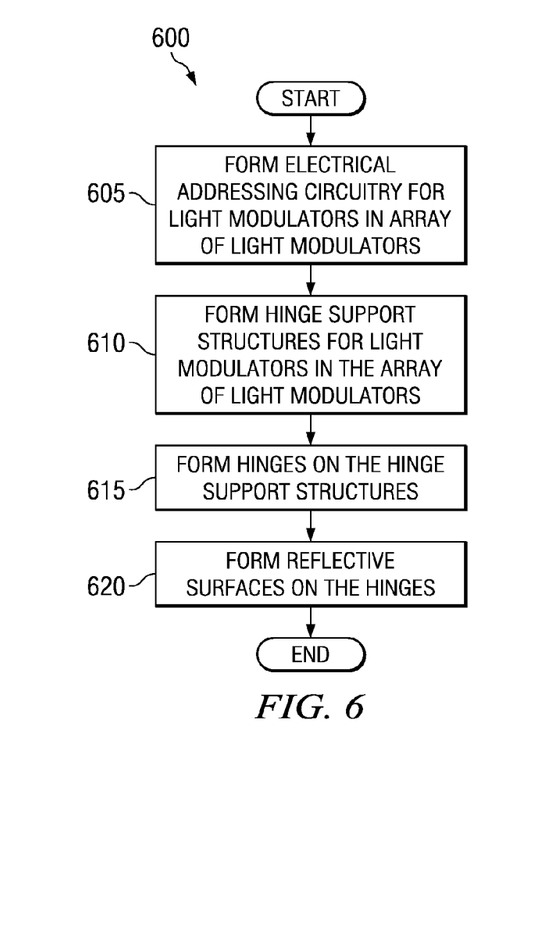
FIG. 6 is a diagram of a sequence of events in the manufacture of an array of light modulators, according to a preferred embodiment of the invention.

With reference now to FIG. 6, there is shown a diagram illustrating a sequence of events in the manufacture of an array of light modulators, wherein the array of light modulators comprises light modulators that belong to one of two different subsets with all light modulators in a single subset reflecting light along a single axis of reflection, according to a preferred embodiment of the invention. The diagram shown in FIG. 6 illustrates a sequence of events 600 in the manufacture of an array of light modulators. The sequence of events 600 describes the events in the manufacture of the array of light modulators, with emphasis on the creation of electrical addressing circuitry, hinges, and reflective surfaces. The manufacture of the array of light modulators may involve additional manufacturing events, including events occurring before the events shown in FIG. 6 and events occurring after the events shown in FIG. 6. Although the following discussion focuses on an array of light modulators with two subsets of light modulators, the sequence of events 600 can be readily applied to arrays of light modulators with three or more subsets of light modulators. Therefore, the discussion should not be construed as being limiting to either the scope or the spirit of the invention.

The sequence of events 600 can begin with the formation of electrical addressing circuitry for individual light modulators in the array of light modulators (block 605). The electrical addressing circuitry can include necessary conductors, capacitors, and so forth, for storing image data and creating an electrostatic field to tilt each light modulator, depending on the specific value of the image data for each light modulator. Since each light modulator in the array of light modulator belongs to one of two different subsets of light modulators, wherein each light modulator in a subset of light modulator reflects light along a single axis of reflection, the electrical addressing circuitry for individual light modulators may need to be properly oriented based upon the light modulator's axis of reflection.

After forming the electrical addressing circuitry, the hinge support structures for the light modulators in the array of light modulators can be formed (block 610). The hinge support structure can be used to provide necessary support for a hinge on which a reflective surface used as the light modulator can pivot. Again, since there are two subsets of light modulators in the array of light modulators, the hinge support structure for each of the two subsets may be different. For example, the hinge support structure for light modulators in the first subset may have a different hinge pivot orientation and location when compared with the hinge support structure for light modulators in the second subset to provide a different axis of reflection for light modulators in the first subset.

Once the hinge support structures for the light modulators have been formed (block 610), the manufacture of the array of light modulators can continue with a formation of hinges for the reflective surfaces for each light modulator in the array of light modulator (block 615). The hinges are the actual pivot points for the reflective surfaces, and as with the electrical addressing circuitry and the hinge support structures, the hinge design can differ depending upon the axis of reflection. Although the hinges may differ depending upon the axis of reflection, a single hinge design may be used if the hinge design is rotated by an amount substantially equal to the difference between the first axis of reflection for the light modulators in the first subset of light modulators and the second axis of reflection for the light modulators in the second subset of light modulators.

After the formation of the hinges (block 615), the reflective surface of the light modulators can be formed (block 620). As discussed previously, the shape of the reflective surface can differ depending upon a number of subsets of light modulators in the array of light modulators to afford a tight packing of the light modulators. Tight packing of the light modulators can reduce the spacing between light modulators and yield a higher quality image (by increasing image density), improve contrast ratio (by reducing scattered light), and enable a smaller physical size for the array of light modulators (by increasing light modulator density), and so forth. For example, with two subsets of light modulators, the square reflective surface may provide the tightest packing of the light modulators, while with three subsets of light modulators, a hexagonal reflective surface may provide the tightest packing of the light modulators.

Figures 7A, 7B:
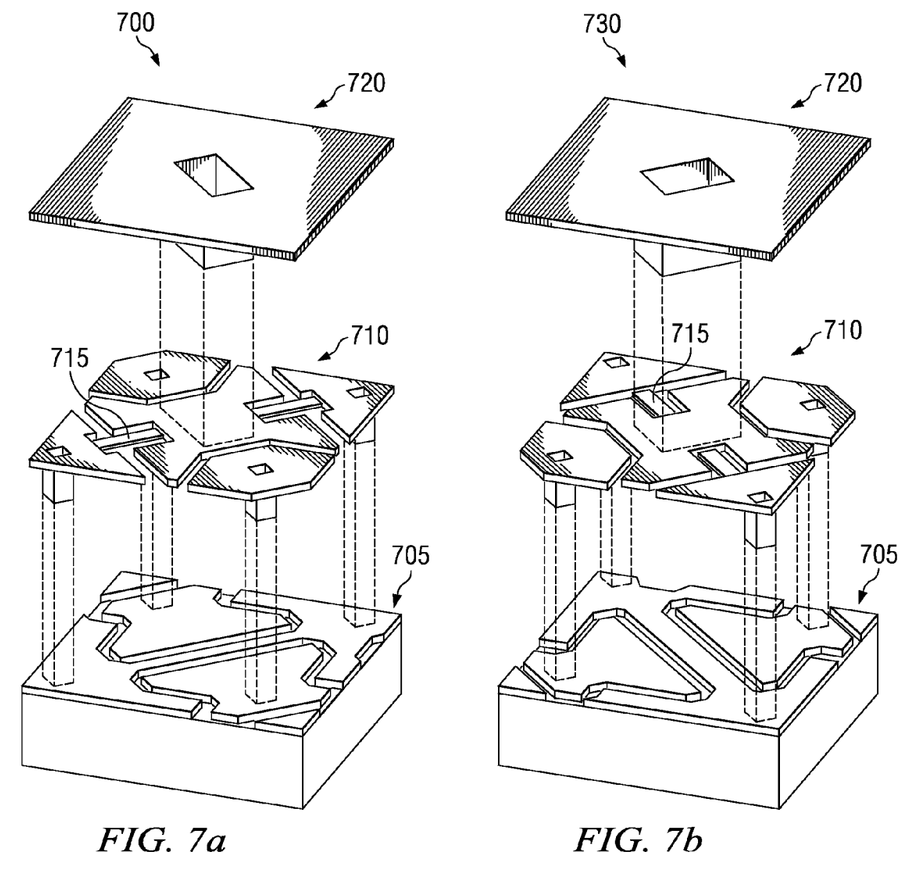
FIGS. 7a through 7c are diagrams of exemplary light modulator designs and an array of light modulators, according to a preferred embodiment of the invention.
Figure 7C:
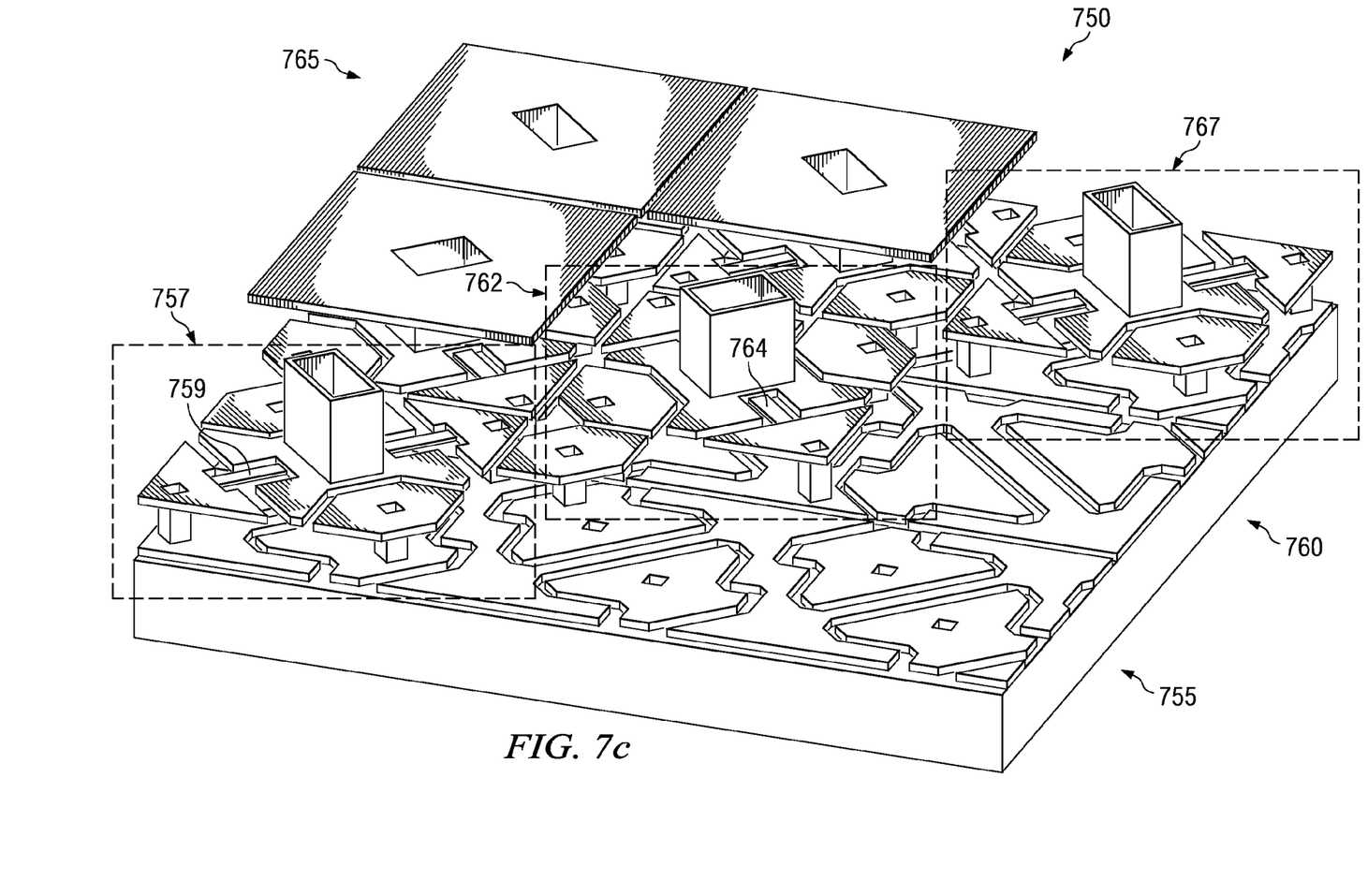

With reference now to FIGS. 7a through 7c, there are shown diagrams illustrating views of exemplary designs for single light modulators and a plan view of an array of light modulators, wherein the array of light modulator comprises two subsets of light modulators, with each subset having a distinct axis of reflection, according to a preferred embodiment of the invention. The diagram shown in FIG. 7a illustrates an exemplary design 700 for a single light modulator. The design 700 for the single light modulator comprises electrical addressing circuitry 705, hinge support structure 710, a hinge 715, and a reflective surface 720. The design and the orientation of the hinge support structure 710 and the hinge 715 (as well as the electrical addressing circuitry 705) can allow the reflective surface 720 to pivot along a first axis of reflection. For example, as shown in FIG. 7a, the first axis of reflection is parallel to a line from the South-West direction to the North-East direction, with the North direction being oriented directly into the page.

The diagram shown in FIG. 7b illustrates an exemplary design 730 for a single light modulator. Similar to the design 700 for a single light modulator shown in FIG. 7a, the design 730 for a single light modulator comprises the electrical addressing circuitry 705, the hinge support structure 710, the hinge 715, and the reflective surface 720. The orientation of the hinge support structure 710, the hinge 715, and the electrical addressing circuitry 705, can permit the reflective surface 720 to pivot along a second axis of reflection. As shown in FIG. 7b, the second axis of reflection is parallel to a line from the North-West direction to the South-East direction. The first axis of reflection of the design 700 and the second axis of the design 730 are preferably orthogonal to each other to minimize the interference of light reflecting from each of the light modulators. The design 730 of a light modulator can be created by rotating the design 700 of a light modulator by 90 degrees. Small changes may need to be made in the design of the electrical addressing circuitry 705 to ensure that the proper connection of the electrical conductors is maintained in the rotated design. Additionally, changes may also be required in the shape of the reflective surface 720 to ensure that the reflective surface 720 is free to move throughout its range of motion. The changes are small in nature and should be readily evident to those of ordinary skill in the art of the invention.

The diagram shown in FIG. 7c illustrates an array of light modulators 750, wherein the array of light modulators 750 comprises nine light modulators arranged in a 3×3 grid, according to a preferred embodiment of the invention. The array of light modulators 750 may be a part of a larger array of light modulators. A first row of light modulators 755 shows a row of three light modulators, wherein each light modulator, such as light modulator 757 (shown without a reflective surface to show underlying structures, such as the hinge and hinge support structures and electrical addressing circuitry), features the design 700 (FIG. 7a) with a hinge 759 oriented along a line starting from the South-West direction and ending at the North-East direction. A second row of light modulators 760 shows a row of three light modulators, wherein each light modulator, such as light modulator 762, features the design 730 (FIG. 7b) with a hinge 764 oriented along a line starting from the North-West direction and ending at the South-East direction. A third row of light modulators 765 shows a row of three light modulators, wherein each light modulator, such as light modulator 767, is implemented using the design 700, as are the light modulators in the first row of light modulators 755.

Although the diagram shown in FIG. 7c illustrates the array of light modulators 750 wherein alternating rows of light modulators belong to a single subset of light modulators, alternate embodiments can have alternating light modulators belonging to a single subset of light modulators (resulting in alternating diagonals of light modulators belonging to a single subset of light modulators), alternating columns of light modulators belonging to a single subset of light modulators, and so forth.

Although the invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the invention, processes, machines, manufacture, compositions of matter, means, methods, or steps, presently existing or later to be developed, that perform substantially the same function or achieve substantially the same result as the corresponding embodiments described herein may be utilized according to the invention. Accordingly, the appended claims are intended to include within their scope such processes, machines, manufacture, compositions of matter, means, methods, or steps.

What is claimed is:

1. A method for simultaneously displaying multiple images with a single array of light modulators, the method comprising:
   providing first light along a first light path to illuminate an array of light modulators, wherein the first light has a first set of optical properties;
   providing second light along a second light path to illuminate the array of light modulators, wherein the second light has a second set of optical properties;
   setting a first light modulator state in a first subset of light modulators in the array of light modulators corresponding to a first set of image data; and
   setting a second light modulator state in a second subset of light modulators in the array of light modulators corresponding to a second set of image data, wherein the first subset of light modulators and the second subset of light modulators comprise alternating adjacent rows, columns, or diagonals of the array of light modulators.

2. The method of claim 1, wherein the first subset of light modulators reflects the first light onto a display plane depending upon the first light modulator state in the first subset of light modulators, and the second subset of light modulators reflects the second light onto the display plane depending upon the second light modulator state in the second subset of light modulators.

3. The method of claim 1, wherein the first light is polarized with a first polarity, wherein the second light is polarized with a second polarity, wherein the first polarity and the second polarity are orthogonal, and wherein the first set of image data and the second set of image data are components of a three dimensional stereoscopic image.

4. The method of claim 1, wherein the first light comprises a first color of light, wherein the second light comprises a second color of light, wherein the first color of light and the second color of light are different and each color is a subset of colors used to display an image, and wherein the first set of image data comprises image data for the first color of light for the image and the second set of image data comprises image data for the second color of light for the image.

5. A method for simultaneously displaying left and right eye image views onto a common display surface with an array of light modulators of a single spatial light modulator for perception of three-dimensional images by a viewer, the method comprising:
   illuminating the array with light of first and second different polarizations;
   setting a first subset of the modulators according to image data of a left eye view of an image, to direct light of the first polarization onto the display surface, thereby displaying the left eye image view in the first polarization; and
   simultaneously with setting the first subset, setting a second subset of the modulators according to image data of a right eye view of the image, to direct light of the second polarization onto the display surface, thereby displaying the right eye image view in the second polarization simultaneously with displaying the left eye view in the first polarization.

6. The method of claim 5, wherein the first and second polarizations are orthogonal to one another.

7. The method of claim 6, wherein the modulators are individually positionable micromirrors of a digital micromirror device.

8. The method of claim 7, wherein illuminating the array includes passing the light through a color wheel; and setting the first and second subsets includes setting the subsets according to image data for the color of the light passed through the color wheel.

9. The method of claim 8, wherein illuminating the array includes passing the light of first and second different polarizations along a common optical path through the color wheel; and then passing the light passed through the color wheel through a polarizing beam splitter to split the light into separate first and second optical paths for the light of the respective first and second polarizations.

10. The method of claim 9, wherein the first and second subsets include corresponding distinct first and second modulators, with the first modulators settable to only pass or block light of the first polarization, and the second modulators settable to only pass or block light of the second subset polarization.

11. The method of claim 10, wherein the first modulators are micromirrors formed on first hinges having axes of rotation oriented in a first direction; and the second modulators are micromirrors formed on second hinges having axes of rotation oriented in a second direction.

12. The method of claim 11, wherein the first direction and the second direction are orthogonal.

13. The method of claim 12, wherein the first modulators and the second modulators are formed in alternating row, column, or diagonal positions in the array.

14. The method of claim 5, wherein the modulators are individually positionable micromirrors of a digital micromirror device.

15. The method of claim 14, wherein illuminating the array includes passing the light through a color wheel; and setting the first and second subsets includes setting the subsets according to image data for the color of the light passed through the color wheel.

16. The method of claim 5, wherein illuminating the array includes passing the light along a common optical path through a polarizing beam splitter to split the light into separate first and second optical paths for the light of the respective first and second polarizations.

17. The method of claim 5, wherein the first and second subsets include corresponding distinct first and second modulators, with the first modulators settable to only pass or block light of the first polarization, and the second modulators settable to only pass or block light of the second subset polarization.

18. The method of claim 17, wherein the first modulators are micromirrors formed on first hinges having axes of rotation oriented in a first direction; and the second modulators are micromirrors formed on second hinges having axes of rotation oriented in a second direction.

19. The method of claim 17, wherein the first modulators and the second modulators are formed in alternating row, column, or diagonal positions in the array.

20. The method of claim 17, wherein the first modulators and the second modulators are distributed substantially evenly throughout the array.

\* \* \* \* \*